US005526208A

United States Patent [19]

Hatch et al.

[11] Patent Number: 5,526,208

[45] Date of Patent: Jun. 11, 1996

[54] FLEX CIRCUIT VIBRATION SENSOR

[75] Inventors: Michael R. Hatch, Mountain View; Joseph T. Castagna, San Jose; Chee K. Han, Milpitas, all of Calif.

[73] Assignee: Quantum Corporation, Milpitas, Calif.

[21] Appl. No.: 291,986

[22] Filed: Aug. 17, 1994

[51] Int. Cl.$^6$ .......... G11B 5/596

[52] U.S. Cl. .......... 360/109; 360/104; 360/97.02

[58] Field of Search .......... 338/2, 3, 4, 5, 338/6; 29/621.1; 73/720, 721, 726, 727; 257/417, 418, 419; 360/75, 77.02, 78.09, 109, 105, 140, 106, 97.01-.04, 137; 369/247, 44.32

[56] References Cited

U.S. PATENT DOCUMENTS

| | | | |
|---|---|---|---|
| 3,611,241 | 10/1971 | Herceg | 338/2 |
| 4,175,445 | 11/1979 | Templeton | 73/726 |
| 4,454,770 | 6/1984 | Kistler | 338/5 |
| 4,478,089 | 10/1984 | Aviles et al. | 73/862.04 |
| 4,520,339 | 5/1985 | Utsunomiya | 338/5 |
| 4,633,212 | 12/1986 | Johnson | 338/2 |
| 5,142,424 | 8/1992 | Hatamura | 360/104 |
| 5,325,081 | 6/1994 | Roberts | 338/2 |
| 5,335,126 | 8/1994 | Tokyuama et al. | 360/104 |
| 5,392,027 | 2/1995 | Brunot et al. | 338/2 |
| 5,459,383 | 10/1995 | Sidman et al. | 318/611 |

FOREIGN PATENT DOCUMENTS

| | | |
|---|---|---|
| 60-171671 | 9/1985 | Japan . |
| 61-107521 | 5/1986 | Japan . |
| 61-239471 | 10/1986 | Japan . |
| 63-304481 | 12/1988 | Japan . |
| 02216684 | 8/1990 | Japan . |

*Primary Examiner*—Stuart S. Levy
*Assistant Examiner*—Paul J. Ditmyer
*Attorney, Agent, or Firm*—David B. Harrison; Debra A. Chun

[57] ABSTRACT

A method and apparatus for sensing vibration in a flex circuit located between a rotary actuator and electronics within a disk drive. Specifically, the apparatus contains a strain gauge attached to or imbedded within the flex circuit. The resistivity of the strain gauge varies in response to vibrations on the cable. This resistance variation can be transformed into electrical signals that are used by a servo system to move the actuator assembly in compensatory motion that effectively cancels any off-track motion caused by the vibrations.

11 Claims, 4 Drawing Sheets

FLEX CIRCUIT VIBRATION SENSOR

BACKGROUND OF THE INVENTION

1. Field of the Invention

The invention relates disk drives having rotary-type actuator assemblies and, more particularly, to a vibration sensor for measuring the vibration on a flexible circuit that connects the disk drive electronics to the actuator assembly.

2. Description of the Prior Art

Data storage devices employing rotating magnetic or optical media disks are known for high capacity, low cost storage of digital data. Such disks typically contain a multiplicity of concentric data track locations, each capable of storing useful information. The information stored in each track is accessed by a transducer head assembly which is moved among the concentric tracks.

Physical positioning of the transducer head assembly is typically accomplished by a rotary actuator assembly which supports the transducer assembly at one end of the rotary actuator assembly. At an opposing end of the actuator assembly is an actuator motor that causes the actuator assembly to pivot about a centrally located axis and position the transducer head assembly over the disk. Control circuitry, within the disk drive electronics, controls the actuator motor such that the head assembly is accurately positioned amongst the concentric tracks on the disk. Typically, the actuator motor forms a portion of a continuously positionable system (servo system) that uses a closed loop servo circuit to control the position or the transducer assembly relative to the tracks on the disk, i.e., the servo system continuously adjusts the position of the actuator assembly based upon servo information read by the transducer assembly from the disk.

Electrical signals are provided to and from the transducer heads and the actuator motor via a flexible circuit (also referred to as a flex circuit or flex cable). The flex circuit typically contains a plurality of copper conductors sandwiched between two polyester or polymer cover layers (e.g. Mylar film). One end of the flex cable connects to the disk drive electronics and the other end of the cable connects to wire leads that, in turn, connect to the transducer heads and the actuator motor.

As the actuator assembly repositions the transducer assembly over the disk, i.e., seeks, the actuator assembly movement excites resonances in the flex circuit. In high capacity drives having a high number of tracks-per-inch (TPI), e.g., 4000 TPI, these resonances can cause significant off-track motion of the transducer heads. For example, empirical testing in 4000 TPI disk drives has discovered 10 to 20 μinches of off-track motion.

Although there are many flex circuit resonances that contribute to the off-track motion, the first mode (lowest frequency) produces the most significant off-track motion. This mode is typically in the 200–300 Hz range for both 3.5 and 2.5 inch form factor disk drives.

Presently in the art this problem is addressed by selecting an appropriately sized and shaped flex circuit. In general, a thicker circuit increases the resonant frequency of the flex circuit. However, a thicker circuit also requires a larger bias force (a larger VCM) to move the actuator assembly across the disk. On the other hand, decreasing the thickness of the flex circuit decreases the resonant frequency of the circuit. However, such a thin flex circuit can be easily damaged during assembly and may not be capable of accommodating copper that is sufficiently thick for signal transmission to and from the actuator motor. Consequently, the problem is typically solved by selecting a thickness of flex circuit that is between the extremes and increasing the TPI such that the first resonance mode does not impact tracking performance to any significant degree.

Therefore, a need exists in the art for a method and apparatus for sensing the resonance vibration of the flex circuit such that the sensed vibration can be utilized by the existing servo system of the disk drive to reduce the off-track motion that would normally be caused by the vibration.

SUMMARY OF THE INVENTION

An object of the present invention is to provide a method and apparatus that senses vibration on the flex circuit and alters a characteristic of the sensing apparatus that is indicative of the vibration.

Another object of the present invention is to provide a flex circuit having vibration sensing apparatus either imbedded therein or attached thereto.

These and other objects of the present invention are provided by a method and apparatus for sensing vibration in the flex circuit. Specifically, the invention is a strain gauge attached to the flex circuit. As such, vibration on the cable alters the resistivity of the strain gauge. The changes in resistivity can be converted into an electrical signal to be used by the servo system to move the actuator assembly in compensatory motion. Such compensatory motion effectively cancels the off-track motion caused by the vibrations.

More specifically, one or more commercially available strain gauge elements are mounted along the flex cable. The resistivity of these elements varies with strain, i.e., strain caused by vibration of the flex circuit. As such, changes in the resistivity can be easily converted into an electrical signal used to drive the actuator assembly in a compensatory motion. Alternatively, the strain gauge element is imbedded within the flex circuit.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF A PREFERRED EMBODIMENT

Figure 1:
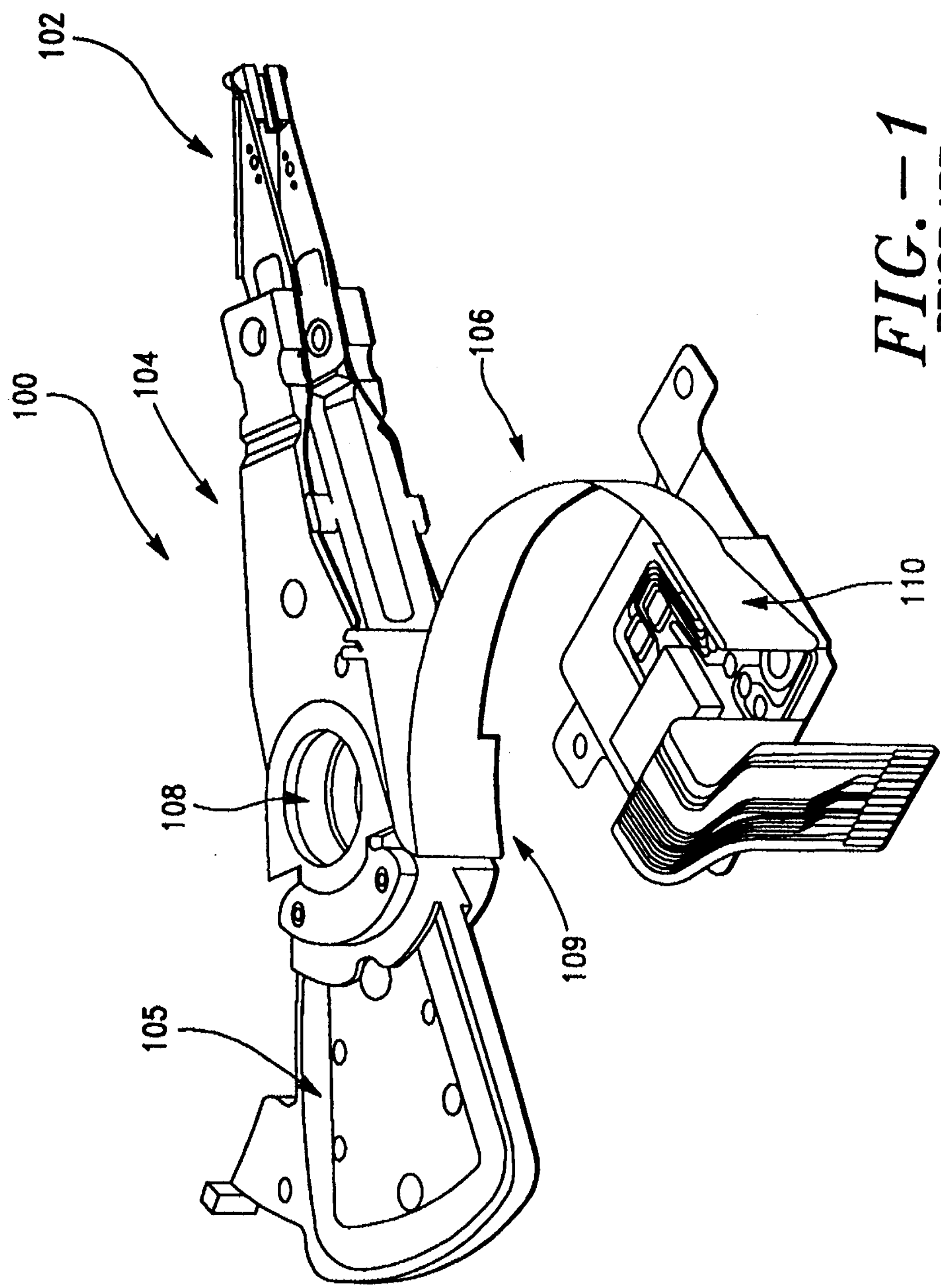
FIG. 1 depicts a rotary actuator assembly and a flex cable connected thereto.

FIG. 1 depicts a perspective view of a conventional rotary actuator assembly 100 and a flex cable 106 attached thereto. The actuator assembly contains a plurality of transducer head assemblies 102, an E-block 104 for supporting the transducer assemblies, and a voice coil, also attached to the E-block 104, for a voice coil motor 105 that, when energized, moves the actuator assembly about a pivot 108. The flex cable 106 carries electrical signals to and from the actuator assembly. End 109 of the flex cable is connected to the E-block and end 110 is connected to circuitry within the disk drive. Typically, end 110 is anchored by a fastener to the housing of the disk drive and the conductor traces are routed to a preamplifier IC chip.

In the prior art, the flex cable 106 typically comprises a plurality of conductors sandwiched between two elongated strips of polyimide film. The plastic film strips are coated on one side with an adhesive such that the strips stick to one another and seal the conductors therebetween. The plurality of conductors carry signals to and from the transducer heads as well as carry voice coil activation current.

Figure 2:
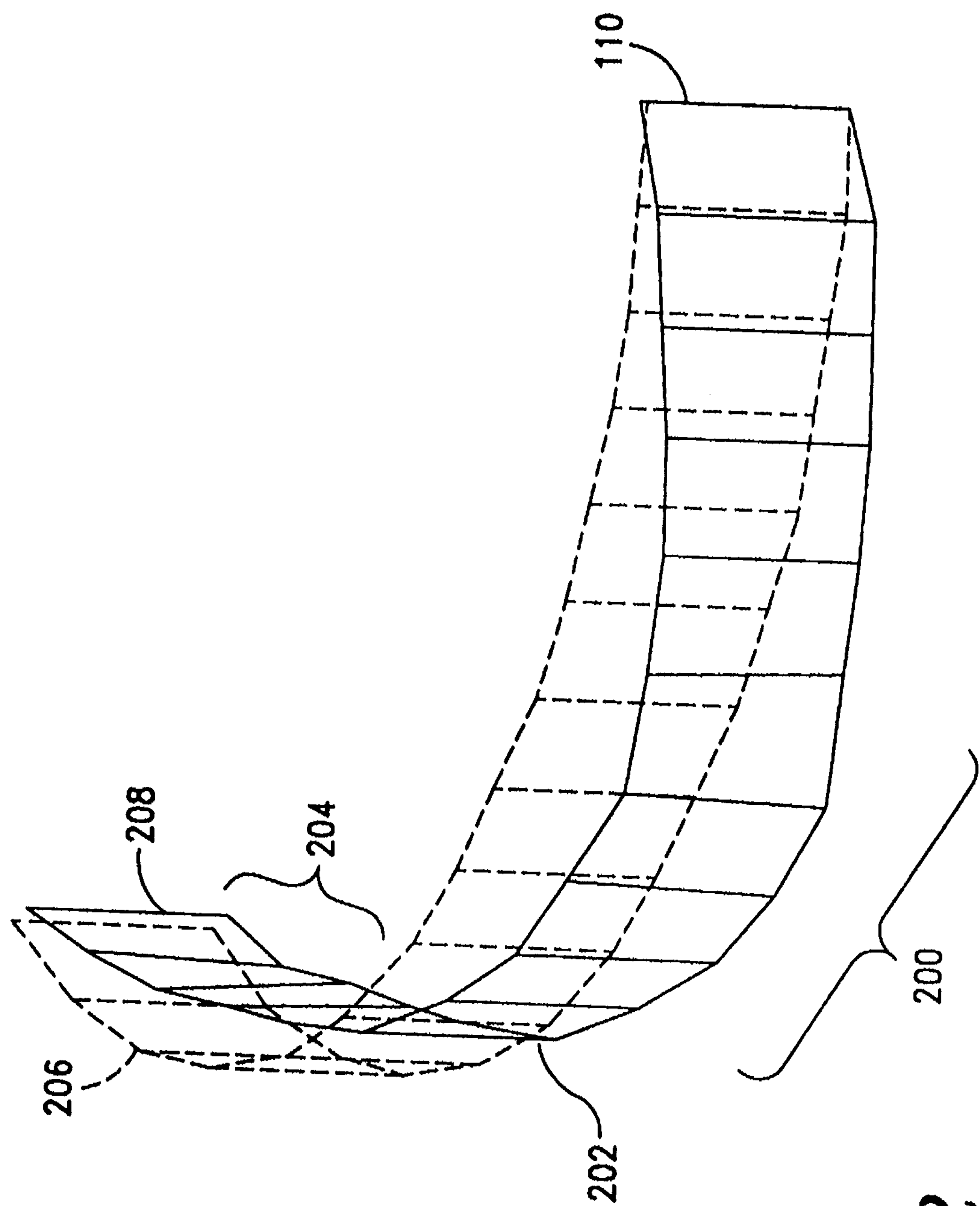
FIG. 2 depicts a schematic representation of an undeformed flex cable and a deformed flex cable.

FIG. 2 schematically depicts the flex cable 106 in an undeformed state 206 and a deformed state 208. During cable deformation, the cable end 109 experiences predominantly tensile forces at the resonance frequency of the cable. Region 200 of the cable experiences predominantly bending forces as the cable is deformed. These bending forces vibrate at the resonant frequency of the cable. Reference numeral 202 indicates a nodal region that experiences almost no motion as the cable deforms. Lastly, region 204 experiences primarily bending forces at the resonant frequency as the cable deforms. Consequently, to generate a signal proportional to the vibration of the cable, a strain gauge should be positioned within a region having tensile forces, i.e., near region 109.

Figure 3:
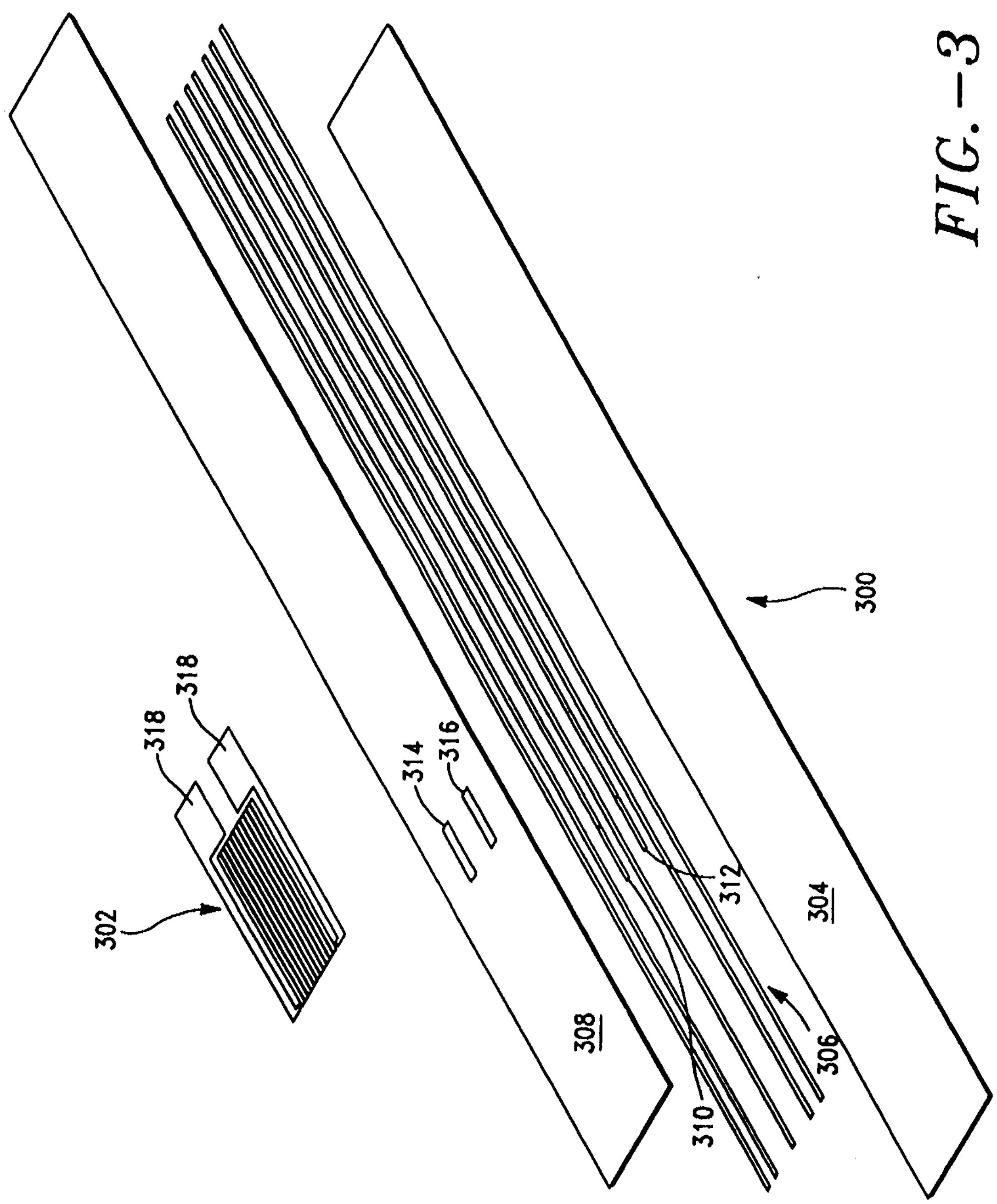
FIG. 3 depicts an exploded view of an embodiment of the present invention.

FIG. 3 depicts one embodiment of the present invention. Specifically, the flex cable 300 contains a strain gauge 302 that measures the vibration of the cable as the cable is deformed. The cable contains a first insulating layer 304, a plurality of conductors 306, a second insulating layer 308 and the strain gauge 302. The first insulating layer is typically manufactured of plastic film and has an adhesive covering the side that faces the conductors. The conductors are typically made of copper. These conductors carry electrical signals to and from the actuator assembly. Additionally, the conductors include leads 310 and 312 that connect to the strain gauge 302. The second insulating layer 308 contains two apertures 314 and 316 that allow access through the layer to the strain gauge leads 310 and 312. The second insulating layer includes an adhesive on the side facing the conductors. When assembled, the conductors are sandwiched between the first and second insulating layers. The strain gauge is positioned on an outer surface of the second insulating layer. The conductive contact pads 318 contact the strain gauge leads 310 and 312 through apertures 314 and 316. As such, alterations in the resistivity of the strain gauge are remotely monitored using the strain gauge leads 310 and 312. Circuitry used to monitor changes in strain gauge resistivity is well known in the art and forms no part of this invention.

The strain gauge used in the embodiment may be one of many conventional "off-the-shelf" strain gauges. Typically, such gauges are fabricated of a highly strain sensitive material such as constantan. One such gauge is a model CEA-09-250UN-120 strain gauge manufactured by the Micro-Measurements Division of Measurements Group, Inc. located in Raleigh, N.C. The particular strain gauge selected is a function of the thermal expansion coefficient of the flex cable, the dimensions of the flex cable, the location of the strain gauge on the cable, and the compatibility of the strain gauge with the manufacturing process used to fabricate the flex cable.

Figure 4:
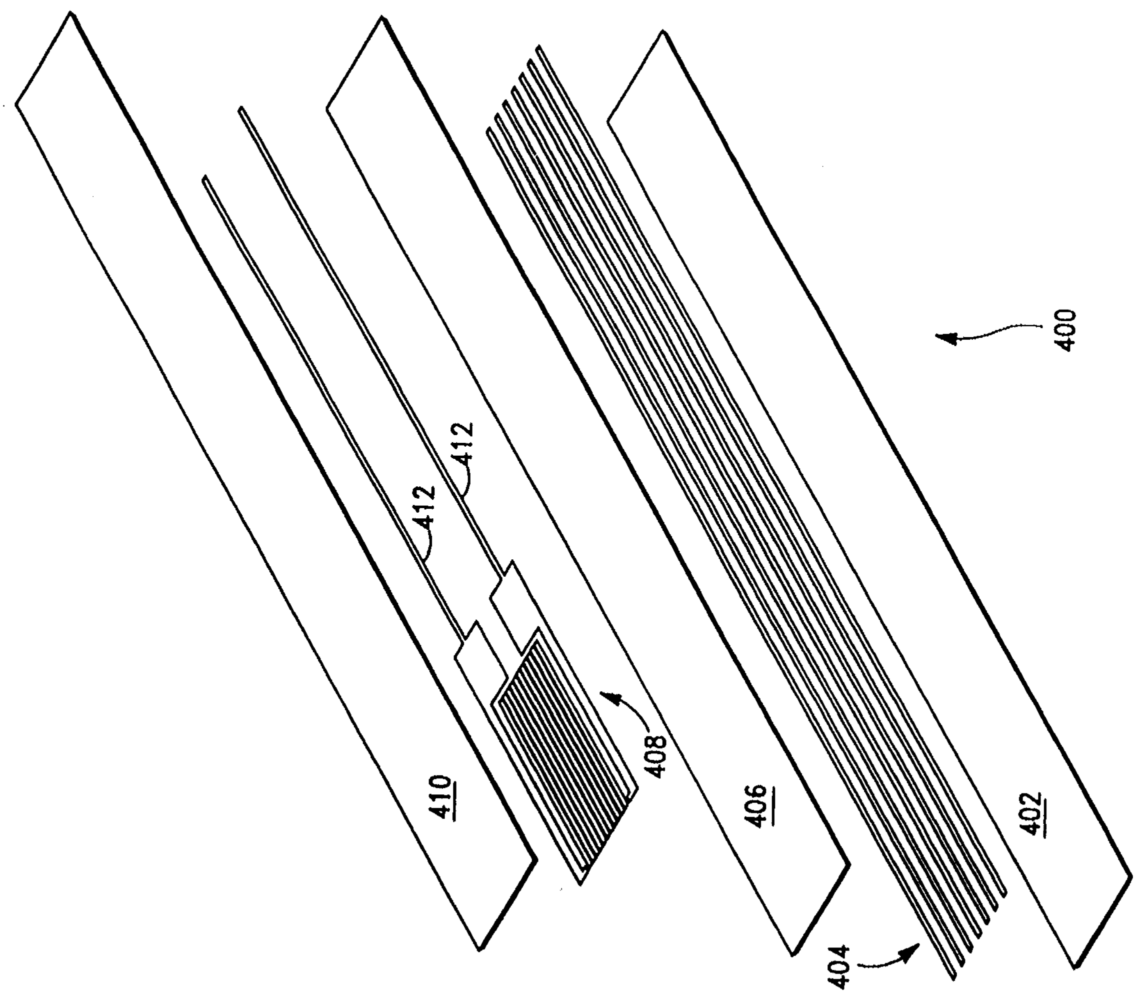
FIG. 4 depicts an exploded view of an alternative embodiment of the present invention.

FIG. 4 depicts an exploded view of a second embodiment of the present invention. In this embodiment, the flex cable 400 is fabricated as a sandwich comprising a first insulating layer 402, a plurality of conductors 404, a second insulating layer 406, a strain gauge 408, and a third insulating layer 410. The insulating layers are typically formed from flexible plastic polyimide film, e.g. Mylar™ film. The conductors are sandwiched between the first insulating layer and the second insulating layer. Typically, both the insulating layers have an adhesive covering the side facing the conductors such that, when assembled, the conductors are affixed to the insulating layers. The strain gauge 408 and its leads 412 are sandwiched between the second and third insulating layers. Typically, both these insulating layers have an adhesive covering the side facing the strain gauge such that, when assembled, the strain gauge and its leads are affixed to the insulating layers. In use, the resistivity of the strain gauge is altered by any vibration of the flex cable. A strain gauge monitoring circuit is used to monitor this change in resistivity.

Rather than utilize a commercially available strain gauge, a strain gauge can be fabricated using the same copper used to fabricate the flex cable conductors. As such, additional copper elements would be used rather than the "off-the-shelf" strain gauge shown in FIGS. 3 and 4. In such an embodiment, the resistivity of the copper elements is monitored in the same manner as described previously.

Additionally, in lieu of a commercially available strain gauge, the resistivity of the conductors within the flex cable can be monitored. As with a strain gauge, the resistivity of the conductors changes as the cable vibrates. In some applications, this resistivity change may be large enough to detect and use to minimize the effects of vibration.

Using either of these flex cable vibration sensing techniques, circuitry within a disk drive can utilize the measured vibration to reduce its effect upon tracking. Specifically, the signals produced by the monitoring circuitry can be used by the voice coil motor control circuit (servo system) to adjust the position of the transducer heads to counteract any movement caused by the flex cable vibration. As such, motion induced by flex cable vibration is minimized.

Although various embodiments which incorporate the teachings of the present invention have been shown and described in detail herein, those skilled in the art can readily devise many other varied embodiments that still incorporate these teachings.

What is claimed is:

1. In a disk drive having a rotary actuator assembly connected to control and signal processing circuitry for positioning the rotary actuator assembly relative to a rotating storage disk having a multiplicity of concentric data tracks, an apparatus for reducing off track motion of the actuator assembly, the apparatus comprising:

a flex cable connecting the control and signal processing circuitry to the rotary actuator assembly; and a strain gauge operatively connected to the flex cable, the strain gauge having a characteristic thereof altered in response to vibrations on the flex cable, the strain gauge measuring vibrations in the flex cable by detecting alteration of the characteristic, and providing detected alteration of the characteristic to the control and signal processing circuitry for positioning the rotary actuator assembly to compensate for the vibrations.

2. The apparatus of claim 1 wherein said characteristic of said strain gauge is resistivity of the strain gauge.

3. The apparatus of claim 1 wherein said strain gauge is imbedded within said flex cable.

4. In a disk drive having a rotary actuator assembly and disk drive electronics, a flex cable for connecting said disk drive electronics to said actuator assembly comprising:

a first insulating layer;

a second insulating layer;

a plurality of conductors, sandwiched between said first and second insulating layers, for transferring electrical signals to and from said actuator assembly;

a strain gauge affixed to a surface of said second insulating layer;

a pair of conductors, sandwiched between said first and second insulating layers, for transferring electrical signals to and from said strain gauge; and said surface of said second insulating layer defining two apertures through which said strain gauge is electrically connected to said pair of conductors.

5. The flex cable of claim 4 wherein said first and second insulating layers are fabricated of flexible plastic film material.

6. In a disk drive having a rotary actuator assembly and disk drive electronics, a flex cable for connecting said disk drive electronics to said actuator assembly comprising:

a first insulating layer;

a second insulating layer;

a plurality of conductors, sandwiched between said first and second insulating layers, for transferring electrical signals to and from said actuator assembly;

a third insulating layer;

a strain gauge sandwiched between said second, insulating layer and said third insulating layer and having a pair of conductors, connected to said strain gauge and sandwiched between said second and third insulating layers, for transferring electrical signals to and from said strain gauge.

7. The flex cable of claim 6 wherein said first, second, and third insulating layers are fabricated of flexible plastic film material.

8. In a disk drive having a rotary actuator assembly positionable relative to a rotating storage disk having a multiplicity of concentric data tracks connected to control and disk drive electronics by a flex circuit, a method for reducing off track motion of the actuator assembly, the method comprising the steps of:

providing a strain gauge operatively connected to said flex circuit;

activating an actuator motor to move the actuator assembly and cause said flex circuit to vibrate;

measuring changes in a characteristic of said strain gauge, a change in the characteristic of said strain gauge being indicative of vibration of said flex circuit; and moving the actuator assembly in response to the measured changes in the characteristic of said strain gauge to compensate for vibrations of the flex circuit, wherein off track motion of the actuator assembly is reduced.

9. The method of claim 8 wherein said characteristic of said strain gauge is resistivity.

10. The method of claim 8 wherein the step of providing the strain gauge comprises attaching the strain gauge to a surface of the flex circuit.

11. The method of claim 8 wherein the step of providing the strain gauge comprises imbedding the strain gauge within the flex circuit.

* * * * *